United States Patent
Carlson et al.

(12)

(10) Patent No.: US 6,195,791 B1
(45) Date of Patent: Feb. 27, 2001

(54) OBJECT MECHANISM AND METHOD FOR COUPLING TOGETHER PROCESSES TO DEFINE A DESIRED PROCESSING ENVIRONMENT IN AN OBJECT ORIENTED FRAMEWORK

(75) Inventors: Brent Allen Carlson, Rochester, MN (US); Jan Olof Engstrom, Stockholm (SE); Timothy James Graser, Rochester, MN (US); Ulf Jesper Thomas Lindblom, Bromma (SE); Barbara Regine Proske, Köln (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,738

(22) Filed: Sep. 29, 1998

Related U.S. Application Data

(63) Continuation-in-part of application No. 09/038,024, filed on Mar. 11, 1998.

(51) Int. Cl.[7] ....................................................... G06F 9/45
(52) U.S. Cl. .............................. 717/1; 717/2; 717/4; 717/5
(58) Field of Search ..................................... 717/1, 2, 5, 4

(56) References Cited

U.S. PATENT DOCUMENTS

| | | | |
|---|---|---|---|
| 5,668,998 | * 9/1997 | Mason et al. | 717/1 |
| 5,729,746 | * 3/1998 | Leonard | 717/1 |
| 5,930,798 | * 7/1999 | Lawler et al. | 717/1 |
| 5,943,497 | * 8/1999 | Bohrer et al. | 717/1 |
| 5,987,247 | * 11/1999 | Lau | 717/2 |
| 6,016,495 | * 1/2000 | McKeehan et al. | 717/1 |
| 6,018,627 | * 1/2000 | Iyengar et al. | 717/1 |
| 6,023,578 | * 2/2000 | Birsan et al. | 717/2 |
| 6,049,665 | * 4/2000 | Branson et al. | 717/2 |
| 6,059,838 | * 1/2000 | Fraley et al. | 717/1 |
| 6,064,813 | * 5/2000 | Sitbon et al. | 717/1 |
| 6,104,874 | * 8/2000 | Branson et al. | 717/2 |

OTHER PUBLICATIONS

Rumbaugh et al.; Object–Oriented Modeling and Design. Prentice–Hall Incorporated, Englewood Cliffs, NJ, Chapter 9, Jan., 1991.*

Betz, M.; "Interoperable Objects: laying the foundation for distributed–object computing". Dr. Dobb's Journal, v19, n11, p18(13), Oct. 1994.*

Derrick et al.; "Domino: A multifaceted framework for visual simulation modeling". INFOR, v35, n2, p93(27), May, 1997.*

Betlem et al.; "An object–oriented framework for production control". IEEE/IEE[online], 1994 International Conference on Control, vol. 2, p1411(6), Mar., 1994.*

(List continued on next page.)

*Primary Examiner*—Tariq R. Hafiz
*Assistant Examiner*—Kelvin E. Booker
(74) *Attorney, Agent, or Firm*—Martin & Associates, LLC; Derek P. Martin

(57) ABSTRACT

In an object oriented computer system, a framework mechanism defines an infrastructure for allowing a user to couple processes in the framework together in any suitable way to define a desired process flow. A user first defines a static object structure that corresponds to the specific process flow from one process to the next. The processes in the framework may be flexibly coupled in any suitable order, so a process does not have knowledge of its predecessor or successor processes. Thus, at run-time, a process determines the next step in the process flow from the static object structure. Once a process determines its subsequent process, a client may then create the next process and invoke methods on one or more objects corresponding to the newly-created process. Each process thus determines at run-time the next step in the process flow from the static object structure that the user statically defined to configure the process flow, which defines the desired processing environment.

30 Claims, 10 Drawing Sheets

OTHER PUBLICATIONS

Weinand et al.; "ET++—an object oriented application framework in C++". ACM Digital Library[online], Conference on Object Oriented Programming Systems Languages and Applications, p46(12), Sep. 1988.*

Rao et al.; "The Information grid: a framework for information retrieval and retieval–centered applications". ACM Digital Library[online], Symposium on User Interface Software and Technology, p23(10), Nov. 1992.*

* cited by examiner

OBJECT MECHANISM AND METHOD FOR COUPLING TOGETHER PROCESSES TO DEFINE A DESIRED PROCESSING ENVIRONMENT IN AN OBJECT ORIENTED FRAMEWORK

REFERENCE TO PARENT APPLICATION

This application is a Continuation-In-Part of "A Method of Developing a Software System Using Object Oriented Technology", U.S. Ser. No. 09/038,024, filed May 11, 1998, which is incorporated herein by reference.

RELATED APPLICATION

This application is related to "Mechanism and Method for Flexible Coupling of Processes in an Object Oriented Framework", U.S. Ser. No. 09/162,719 filed Sep. 29, 1998, which is incorporated herein by reference.

BACKGROUND OF THE INVENTION

1. Technical Field

This invention generally relates to object oriented programming and more specifically relates to a mechanism and method for defining a desired processing environment in an object oriented framework.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. Frameworks typically define certain core functions that cannot be changed by a programmer using the framework, and allow the programmer to extend the framework at defined extension points to generate a custom software application in much less time than coding the software application from scratch.

The function of a software application can be thought of as a series of "processes". Some of these processes may have time-order dependence on other processes. For example, the output from one process may be used as the input to one or more subsequent processes. These processes may need to be combined in different ways depending upon the applicable rules for the particular software application and depending on the type of data being processed. A software application that is developed from scratch typically has the order of processes and their interrelationship hard-coded. A software application developed from most framework mechanisms has the order of processes and their interrelationship defined by some extent by the core functions of the framework, limiting the amount of customization available to a programmer who extends the framework.

Frameworks may be very general or can be a very specific solution to a particular problem. Framework developers typically make trade-offs between the number of functions the framework supports and the flexibility in using the framework. The more functions that are built into the core functions of the framework, the less time a programmer has to spend generating code to extend the framework. However, more functions generally mean a more detailed implementation within the framework itself, which typically reduces the ability to adapt the framework to different circumstances. Fewer core functions in the framework generally makes the framework more flexible, but decreases the power of the framework, putting more of a programming burden on the user that extends the framework to define a software application. Most frameworks try to balance performance with flexibility by defining core aspects of a specific problem within the framework, while allowing user customization of domain-specific information in the extensions to the framework. This approach can lead to a variety of different frameworks that are each targeted for specific types of software applications. For example, a framework for performing computer system diagnostics may have many different core functions than a framework for order processing. However, even a single type of application, such as order processing, can have a wide variety of different steps and orders of those steps that vary greatly according to the specific type of business and rules that the business has in place.

Examples of a few different types of order processing systems will illustrate the diversity of possible order processing systems. For a mail-order company that bills their customers after shipping the goods, the order processing may be represented at a high level by the following sequence of processes: 1) generate order; 2) pick order; 3) ship order; 4) generate invoice; and 5) confirm payment. A mail-order company that requires payment before shipping the goods may have a different order processing sequence: 1) generate order; 2) confirm payment; 3) generate invoice; 4) pick order; and 5) ship order. In this latter example, the generation of the invoice is done before the item is picked or shipped. A retail company typically has in-store stock, so the steps of picking and shipping the order are not required. Thus, the process steps and order of steps can vary greatly from one order processing system to the next. These examples serve to illustrate the point that virtually endless numbers and combinations of steps are possible in order processing, and in many other type of processing environments.

One solution to the wide array of possible combinations in order processing is to provide a framework that defines specific steps for a particular type of order processing. This solution would require three separate frameworks for the three order processing scenarios presented above. However, generating three separate frameworks for three different types of order processing essentially ignores the common features that exist in most order processing systems.

IBM has introduced a framework known as San Francisco that defines processes that may be flexibly coupled together. These flexibly coupled processes are described in co-pending U.S. patent application Ser. No. 09/162,719 entitled "Mechanism And Method For Flexible Coupling of Processes in an Object Oriented Framework", filed by Carlson et al. on Sep. 29, 1998. This related patent application describes the mechanism that provides the interfaces that allow processes to be flexibly coupled together. However, without a mechanism for coupling these processes together to define a desired processing environment, the processes that support flexible coupling will be of no use.

DISCLOSURE OF INVENTION

In an object oriented computer system, a framework mechanism defines an infrastructure for allowing a user to couple processes in the framework together in any suitable way to define a desired process flow. A user first defines a static object structure that corresponds to the specific process flow from one process to the next. The processes in the framework may be flexibly coupled in any suitable order, so a process does not have knowledge of its predecessor or successor processes. Thus, at run-time, a process determines the next step in the process flow from the static object structure. Once a process determines its subsequent process, a client may then create the next process and invoke methods on one or more objects corresponding to the newly-created process. Each process thus determines at run-time the next step in the process flow from the static object structure that the user statically defined to configure the process flow, which defines the desired processing environment.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
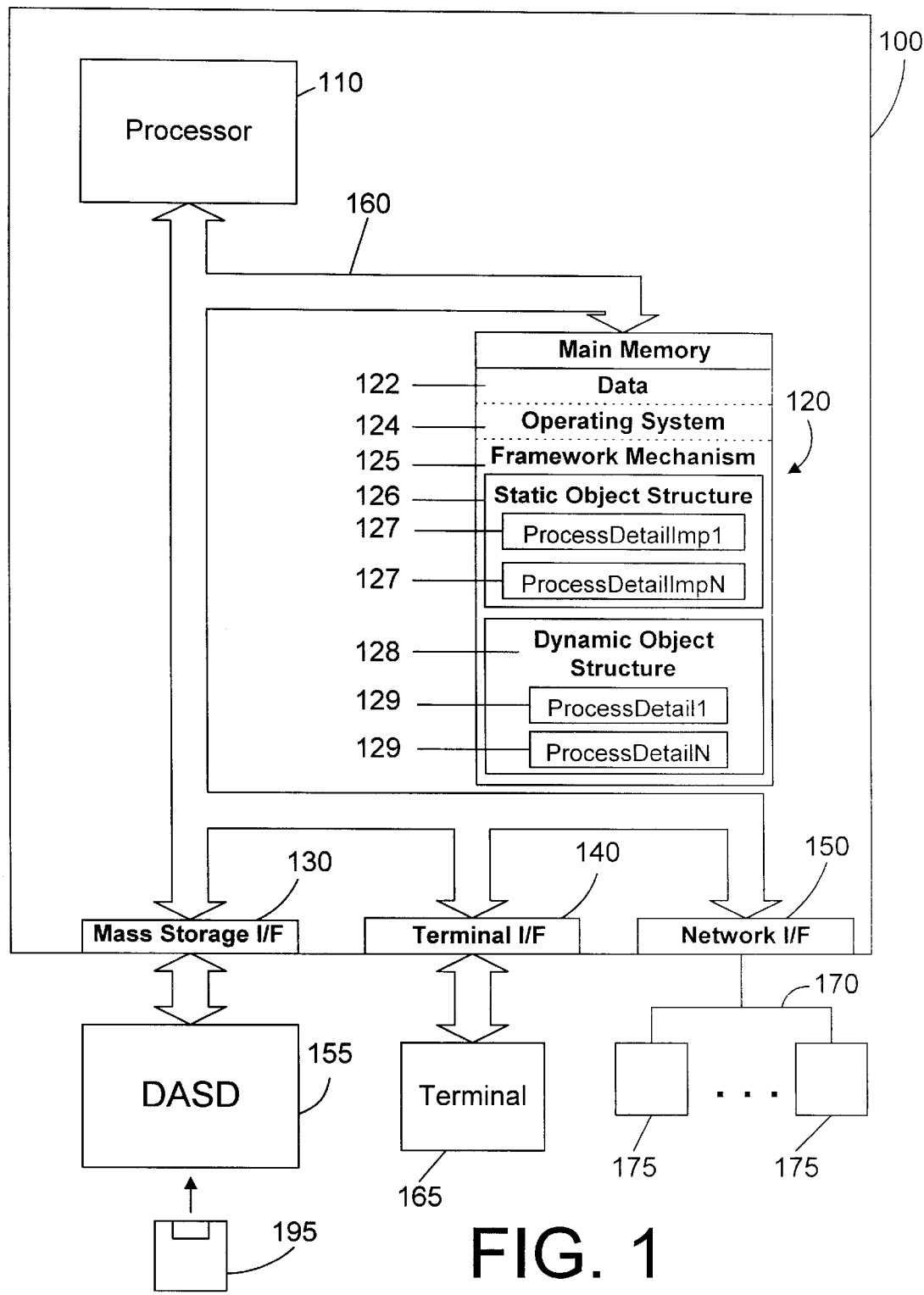
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

Figure 2:
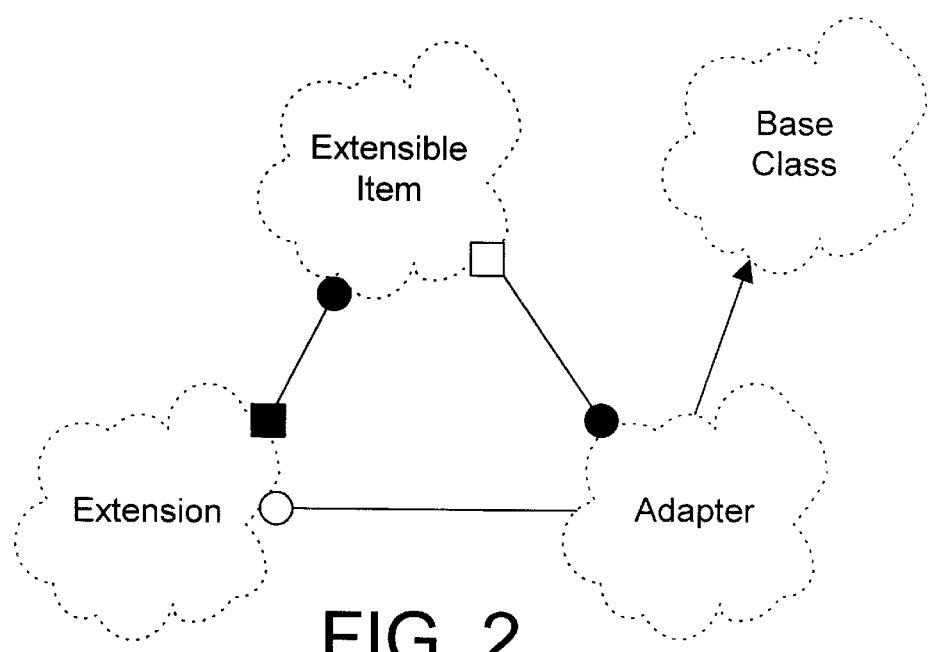
FIG. 2 is a class diagram of an extensible item and its related classes.

The class diagram of FIG. 2 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "using" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object. The Adapter class is provided to allow an ExtensibleItem object owning an object of the given Extension class to be treated as a true instance of the BaseClass.

Figure 3:
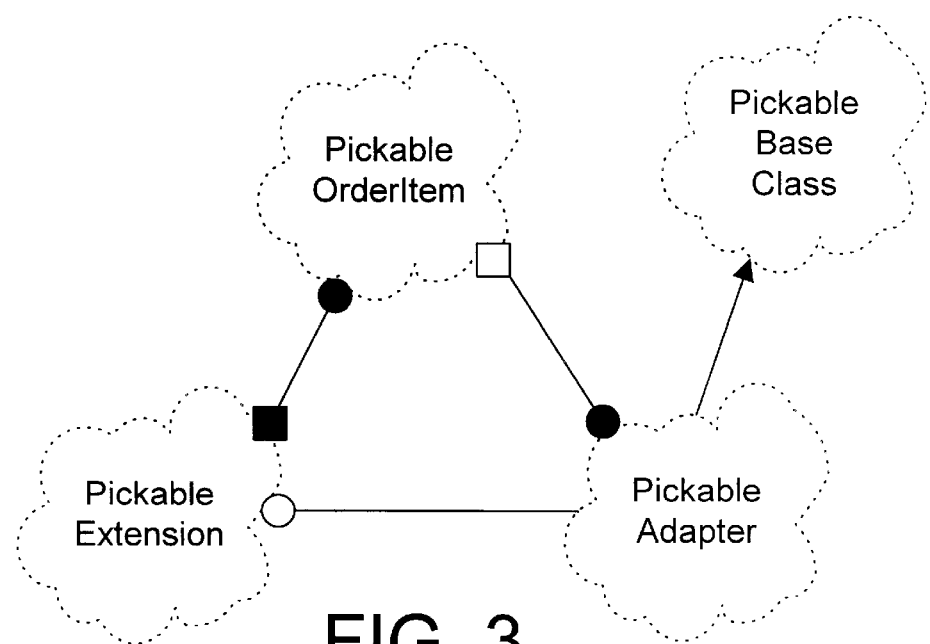
FIG. 3 is a class diagram of one specific example of an extensible item.

A specific example helps to illustrate the concepts of domain-specific extensions to a domain-neutral object. Let's assume there is a need for a "pickable" order item. Referring to FIG. 3, a PickableOrderItem class represents a domain-neutral extensible item, and includes an instance of a PickableExtension class, which extends the PickableOrderItem for use in a specific domain that requires objects that are pickable. A PickableAdapter class has a reference to the PickableOrderItem class, and supports the interface of the PickableBaseClass. The class configuration of FIG. 2, as illustrated in the specific example of FIG. 3, allows extensions to be dynamically added to and deleted from an extensible item object as the desired function of the object changes.

Figure 4:
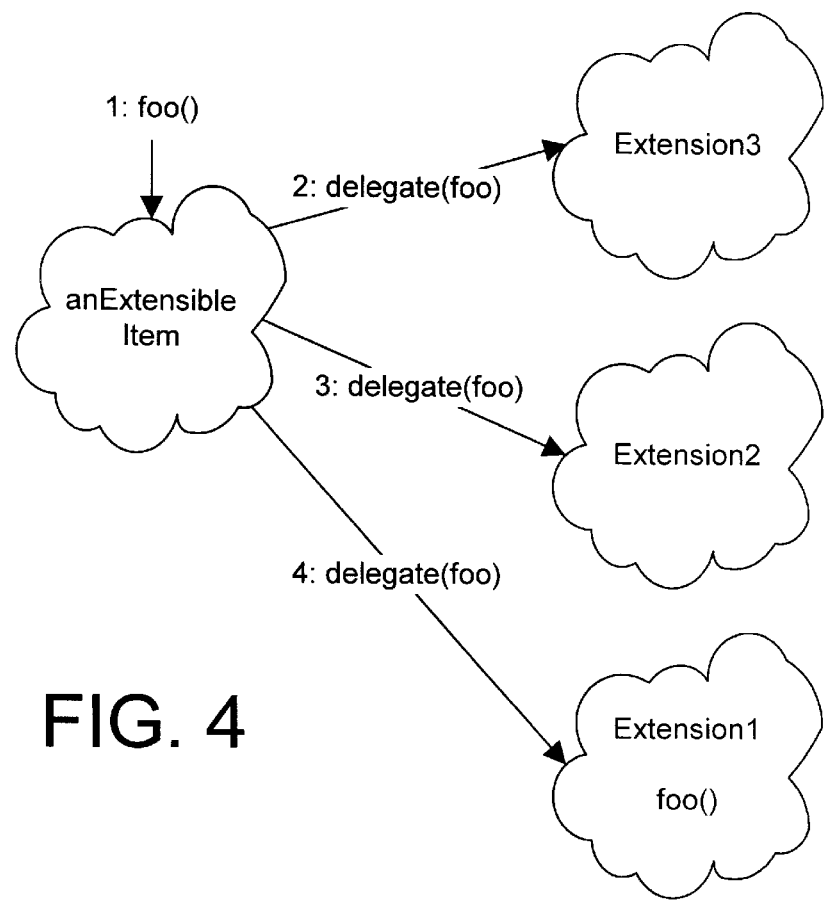
FIG. 4 is an object diagram illustrating the delegation of method calls to extension objects.

An instance of the ExtensibleItem class can service method calls in a number of different ways. Referring to FIG. 4, an instance an ExtensibleItem has three associated extensions, Extension3, Extension2, and Extension1. One way for an ExtensibleItem to service a method call is to determine which extension can handle the method call, progressing from the newest (Extension3) to the oldest (Extension1). For example, we assume that Extension1 supports a method called "foo", and that "foo" is invoked on an ExtensibleItem (step 1). The an ExtensibleItem object first delegates the "foo" method to Extension3 (step 2). Extension3 does not support the method, so an ExtensibleItem delegates the call to "foo" to the next extension, Extension2 (step 3). Extension2 does not support the "foo" method, so an ExtensibleItem delegates the call to "foo" to Extension1 (step 4). Extension1 supports "foo", so Extension1 executes its "foo" method in response to an ExtensibleItem delegating "foo" to Extension1 in step 4. Note that the first extension to support the "foo" method will execute its "foo", and other implementations of "foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that it's interface supports, as shown in FIG. 4. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensionItem.

Figure 5:
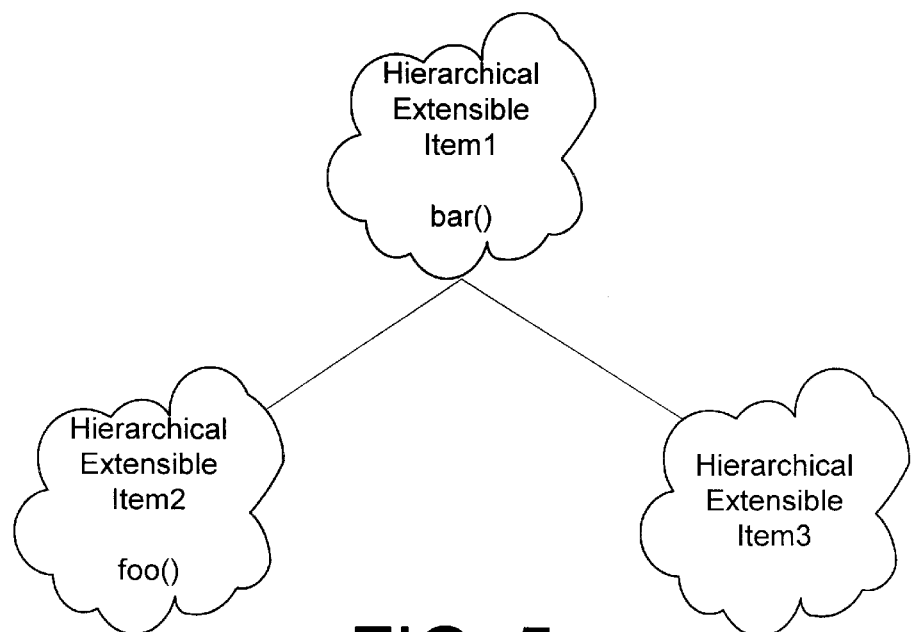
FIG. 5 is an object tree for illustrating the delegation of method calls to parent and children objects in an object tree.

If an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 5, a very simple tree structure is provided to illustrate the delegation of method calls from one object in a tree structure to another. We assume that a class HierarchicalExtensibleItem is a subclass of ExtensibleItem that enhances ExtensibleItem by adding behavior to explicitly allow invoking methods in either a "drill up" or "drill down" fashion. HierarchicalExtensibleItem1 is an instance of the HierarchicalExtensibleItem and is at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 5), and stop there. This concept of upwards and downwards delegation of method calls can be extended indefinitely throughout a tree structure of ExtensibleItems.

Extensible items thus provide a powerful and dynamic way to change the interface for an object at run-time so the object can acquire and tailor its domain-specific behavior as required.

Flexibly Coupled Processes

An important concept embodied in the San Francisco framework is the ability to define processes that may be flexibly coupled to each other, as described in the co-pending parent patent application entitled "Mechanism and Method for Flexible Coupling of Processes in an Object Oriented Framework", U.S. Ser. No. 09/162,719 filed Sep 29, 1998. This parent application describes how providing processable and processing interfaces allows classes to be flexibly coupled together in any suitable manner. However, the mere definition of processes that support flexible coupling is not enough to create custom process types. A mechanism is needed to define a processing environment so that run-time instances of process details can dynamically determine the next process in the process flow defined by the processing environment. The preferred embodiments herein describe such a mechanism.

2. Detailed Description

According to a preferred embodiment of the present invention, a mechanism and method provide a way to define different processing environments by statically defining an object structure that represents the process steps in a process flow. When a run-time instance of any process detail needs to be created, methods on the static object structure are invoked to return to the current process the next process in the process flow. The object structure thus acts as a template for creating run-time instances of process details.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes a static object structure 126 and a dynamic object structure 128. Static object structure 126 is hierarchy level information that a programmer or user creates at configuration time to define a particular processing environment, also referred to herein as a process type or process flow. As used herein, the term "configuration time" broadly means any time that allows the software application defined by the extended framework to be configured by defining the static object structure 126. One suitable way to define the static object structure 126 while extending the framework follows. A programmer may create a static object structure by creating hierarchy level information in the form of classes coupled together to form a valid process type. Each class corresponds to a level in the hierarchy for the process type defined by the coupled classes. The classes include references to valid child processes that may follow, and suitably include references to information that governs the life cycle of the processes they represent. Subclasses of the process classes are created that include shared data and attributes for a particular level in the hierarchy. When instances of these classes are created when the system starts up, these instances form the static object structure 126. The static object structure is therefore an instance of a structure of classes that is used as a template for creating a valid process type, analogous to how a class is used to instantiate an object. The term "static object structure" is used to denote this group of object instances that are statically interconnected at configuration time to define one or more process types.

Another suitable way to define a static object structure is to provide a software application by extending the framework that allows an end-user of the software application to link graphical representations of the classes together before execution of the software application begins. This is another example of defining the static object structure at configuration time. Of course, many other examples not enumerated herein could define a static object structure at configuration time, and the present invention expressly encompasses any and all methods and mechanisms, whether now known or developed in the future, for defining a static object structure within framework 125.

Figure 11:
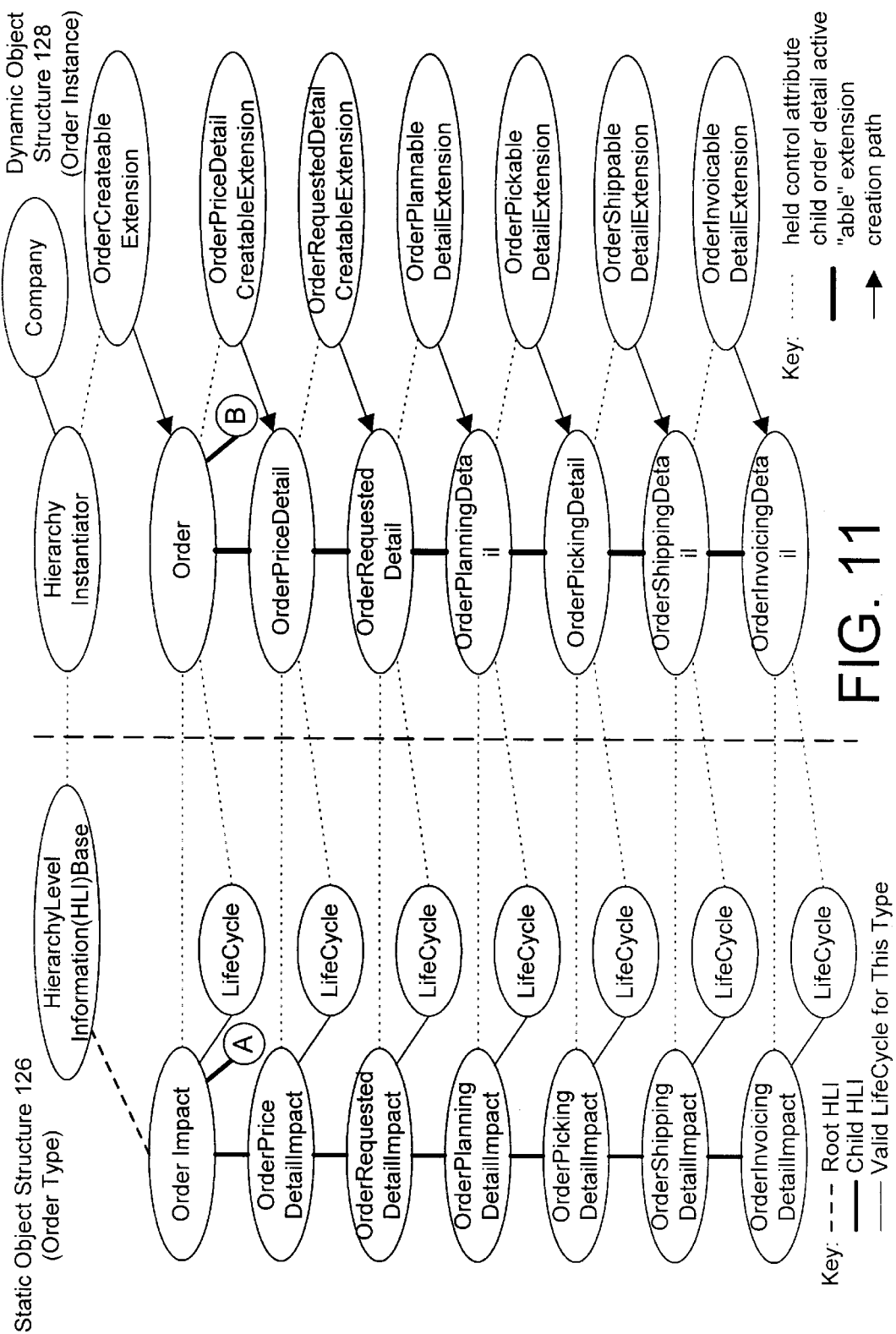
FIG. 11 is an object structure diagram showing the relationships between the static object structure that defines the order type and the dynamic run-time instances of objects in accordance with the preferred embodiments.

Note that framework mechanism 125 may contain many different static object structures, each corresponding to a valid process flow. In addition, some static object structures may be used as building blocks that are sub-components to different process flows. Static object structure 126 in FIG. 1 represents a valid process type. Each valid process type includes one or more process detail impacts 127 that define how to create a particular kind of process detail. Each detail impact 127 includes hierarchy level information that defines its valid subsequent processes, which are denoted herein as child processes. In addition, each detail impact 127 includes shared data and shared algorithms that each instance at that level in the hierarchy can access. While not shown in FIG. 1, each detail impact 127 also references a corresponding life cycle, as shown in FIG. 11.

Framework mechanism 125 also includes a dynamic object structure 128. Note that the representation of FIG. 1 that the dynamic object structure 128 resides in the framework mechanism 125 assumes that the framework mechanism 125 has been extended by a programmer, and that the framework mechanism 125 in memory 120 is an extended run-time application that includes the extended framework mechanism. An alternative view would have the framework mechanism represent the framework as shipped to the user, and would have the dynamic object structure 128 separate from the framework. Both of these concepts are within the scope of the present invention.

The dynamic object structure 128 is created at run-time, and the objects within dynamic object structure 128 have relationships defined by the static object structure 126. Each process detail 129 created within the dynamic object structure 128 has a corresponding process detail impact 127 within the static object structure 126 that contains the information needed to create the process detail 129. Thus, when ProcessDetail1 needs to be created, the dynamic object structure queries the static object structure for a process detail impact 127 that corresponds to ProcessDetail1, which returns ProcessDetailImp1. The dynamic object structure 128 then creates ProcessDetail1 according to the information in ProcessDetailImp1, and performs processing in accordance with shared data and algorithms defined by ProcessDetailImp1. This method of invoking the static object structure for information regarding the next step in the process flow is repeated for each step in the process flow. Thus, dynamic object structure 128 is constructed one process detail 129 at a time, by querying the static object structure 126 to determine a corresponding processing detail impact 127 that contains the instructions for creating a particular processing detail 129.

Computer system 100 utilizes well known virtual addressing mechanisms that allow the programs of computer system 100 to behave as if they only have access to a large, single storage entity instead of access to multiple, smaller storage entities such as main memory 120 and DASD device 155.

Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 6:
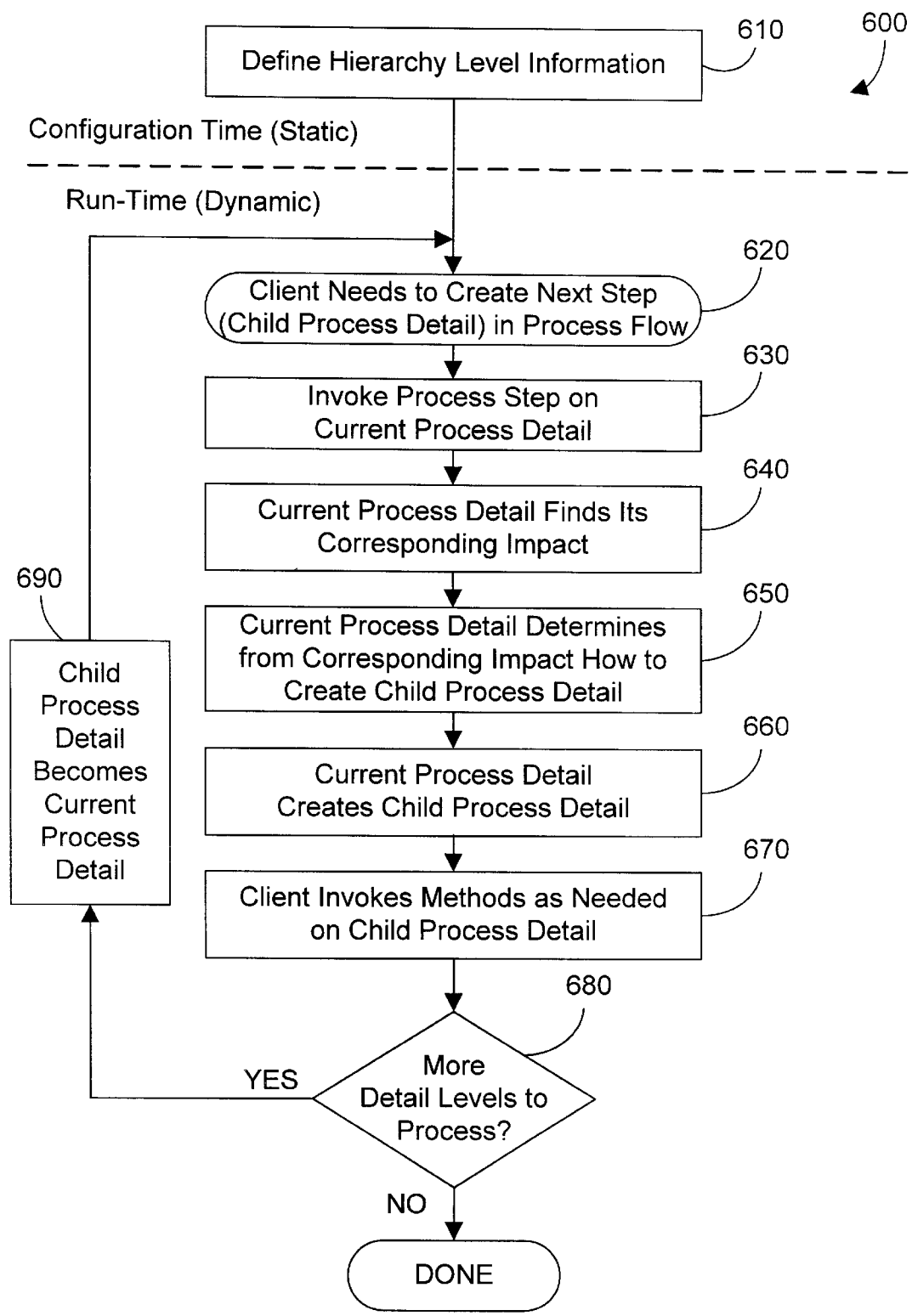
FIG. 6 is a flow diagram showing the steps in coupling processes together to define a desired processing environment in accordance with the preferred embodiments.

Referring to FIG. 6, a method 600 provides the steps for defining a particular process flow and for creating run-time processes that correspond to the process flow without the processes having direct knowledge of their predecessor or successor processes. Method 600 is temporally divided into two different portions, as denoted by the horizontal dashed line separating steps 610 and 620. A programmer at configuration time first defines hierarchy level information that makes up the static object structure (126 in FIG. 1)(step 610). This hierarchy level information is a sort of "template" that defines a hierarchy of processes that collectively comprise a process flow. As described above, the hierarchy level information is a collection of process detail impacts 127 that a programmer couples together in a particular hierarchical arrangement to define a desired process flow. For example, the user could use a tool that provides a menu of possible process detail impacts 127, and allows coupling these impacts together in a desired order to define a desired process flow. Because process detail impacts 127 may be re-used across different process types, the behavior of each impact across different process types will be consistent, thereby simplifying the maintenance of a software application that uses the framework. A change to one impact will change the behavior for that impact in each process type where the impact is used, so the impact need only be changed once.

Once the process flow is defined in step 610 by the hierarchy level information contained within the static object structure 126, the static object structure 126 is then used at run-time to invoke the hierarchy level information so a run-time dynamic object structure (128 in FIG. 1) is constructed that corresponds to the hierarchy level information in the static object structure 126. Step 620 in method 600 indicates the commencement of the run-time portion of method 600, which starts when a client needs to create a next step in the process flow. Note that the client may be an end user interacting with the application, the application (e.g., during batch processing), or the static object structure 126 itself (e.g., the life cycle for a particular process is configured to automatically invoke the next process step upon creation of a particular process detail). Of course, other clients are known in the art, and the present invention expressly encompasses any and all clients that are capable of commencing method 600. A client may create the next step in the process flow by invoking an explicit create() constructor method, or by a process (such as Pick or Invoice) causing the next step to be created. This next step can be the first process detail, if the dynamic object structure 126 is just starting to be built, or may be a process detail at any level in the process flow. When step 620 is satisfied, the client invokes the process step on the current process detail (step 630). For the purpose of explaining method 600, a "current process detail" is the process at the current level of processing defined by the hierarchy level information, while a "child process detail" is a process detail that is allowed to follow the current process detail. When the process step on the current process detail is invoked in step 630, the current process detail finds its corresponding process detail impact in the static object structure (step 640). Once the corresponding process detail impact has been located, the current process detail determines from its corresponding impact how to create the next child process detail (step 650). The current process detail then creates the child process detail (step 660). In the preferred embodiment, the current process detail delegates the creation of the child process to a "createable" extension to the current process detail. The client may invoke various methods on the child process detail (step 670). Some of these methods may be delegated by the detail to its associated impact object. Eventually, the client determines if more detail levels need to be processed (step 680). If the child process detail is the last process step in the processing flow (step 680=NO), method 600 is done. If, however, the child process detail has one or more children process details (step 680=YES), the child process detail becomes the current process detail (step 690), and steps 620 through 680 are repeated for the next level down in the processing flow. Note that step 690 is not a step that is actually carried out in a processing system that performs method 600, but is rather a housekeeping step specific to the flow diagram of FIG. 6 to allow re-use of common steps at different levels in the processing flow. Also note that step 680 can occur at any time after the completion of step 660 and may involve a separate client. This would be the case, for example, in an application that is designed to support overnight batch processing of all process details of a certain type created during the preceding day.

Figure 7:
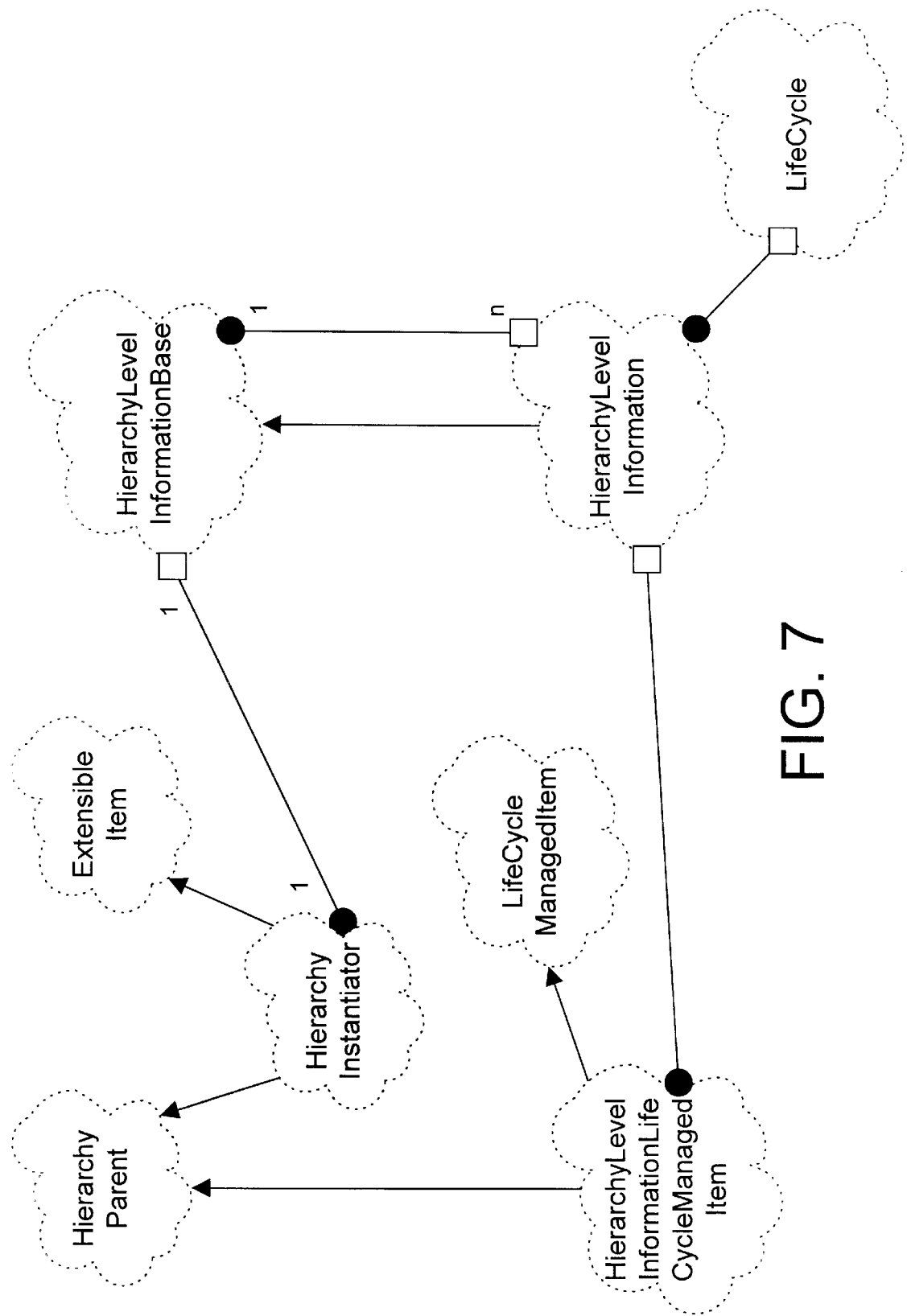
FIG. 7 is a class diagram showing classes and class relationships in accordance with a preferred embodiment.

Referring to FIG. 7, a class diagram represents many of the classes and class relationships in accordance with a preferred embodiment of the present invention. At the top level is a HierarchyParent class that defines common methods that are needed to retrieve hierarchy level information. Both the HierarchyInstantiator class and the HierarchyLevelInformationLifeCycleManagedItem class are subclasses of HierarchyParent. In addition, HierarchyLevelInformationLifeCycleManagedItem is also a subclass of the LifeCycleManagedItem class, and contains a reference to corresponding HierarchyLevelInformation. HierarchyInstantiator is also a subclass of the ExtensibleItem class, as described above with reference to FIG. 2. The HierarchyInstantiator class contains a reference to the HierarchyLevelInformationBase class, which is the top-level class used to define process types or flows. HierarchyLevelInformation is a concrete subclass of the HierarchyLevelInformationBase class, and contains a reference to its corresponding LifeCycle. Note that a HierarchyLevelInformationBase object will contain a collection of concrete HierarchyLevelInformation objects, as denoted by the "contains by reference" relationship between these classes. For convenience in the discussion that follows, the term "hierarchy level information" is abbreviated as HLI, so the HLIBase class refers to the HierarchyLevelInformationBase class, while an HLI object refers to an instance of a HierarchyLevelInformation concrete subclass.

Figure 8:
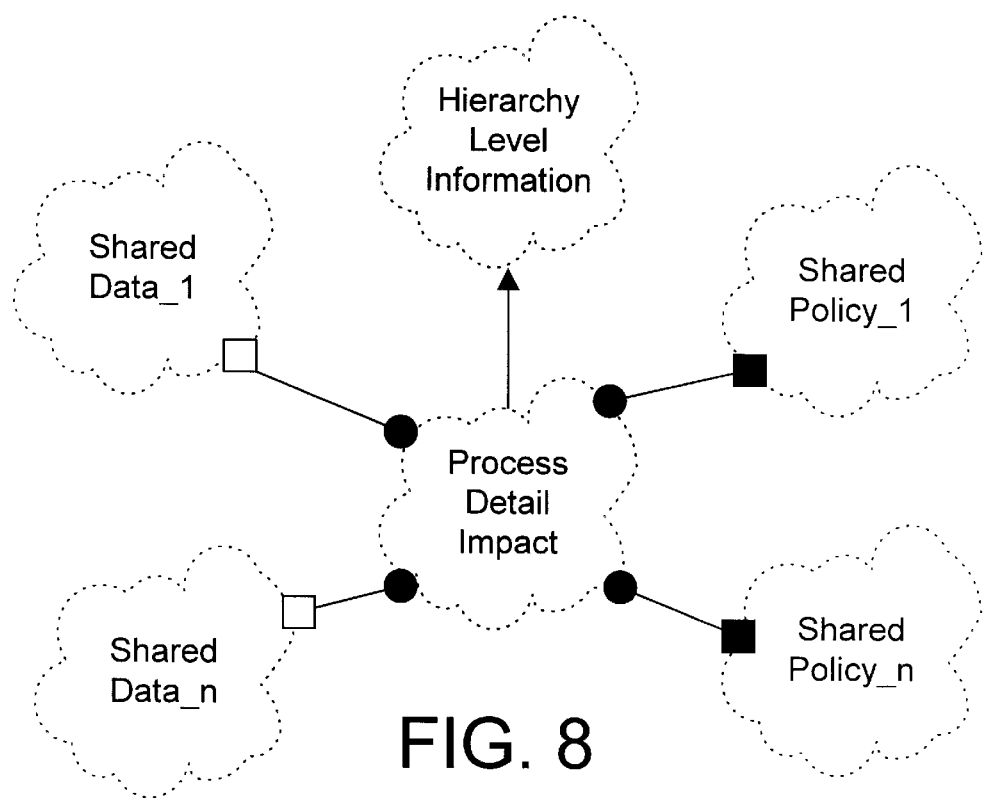
FIG. 8 is a class diagram showing a process impact that contains shared data and shared policies.

Referring to FIG. 8, a ProcessDetailImpactClass is an example of a class under which ProcessDetailImpact1 through ProcessDetailImpactN 127 in FIG. 1 are instantiated. ProcessDetailImpact is a subclass of an appropriate HLI concrete subclass, and contains references to shared data (represented as classes SharedData_1 and SharedData_n), and contains shared algorithms (represented as classes SharedPolicy_1 and SharedPolicy_n). Note that any number of shared data and shared policy classes may be contained or referenced by the ProcessDetailImpact class. In addition, shared data may also be of primitive types, such as booleans, as well as object instances.

Figure 9:
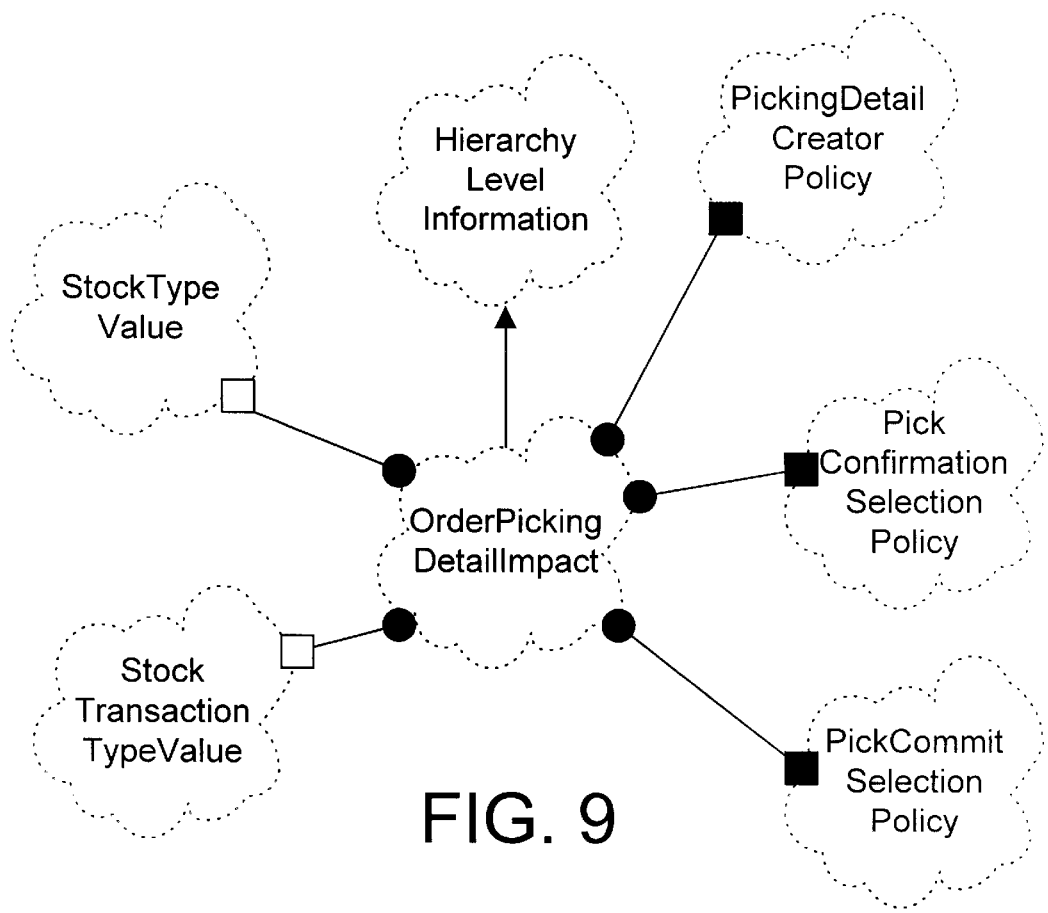
FIG. 9 is a class diagram of a specific order picking detail impact in an order processing system as an example of one type of process impact shown in FIG. 8.

FIG. 9 shows an OrderPickingDetailImpact class as a specific example of one particular type of process detail impact that might exist in an order processing environment. For the sake of illustration, OrderPickingDetailImpact contains references to the StockTypeValue and StockTransactionTypeValue classes, which represent data that is shared among all instances of OrderPickingDetailImpact. OrderPickingDetailImpact also contains shared algorithms, represented by the PickingDetailCreatorPolicy class, the PickConfirmationSelectionPolicy class, and the PickCommitSelectionPolicy class. These policies define algorithms that are shared among all instances of OrderPickingDetailImpact.

Figure 10:
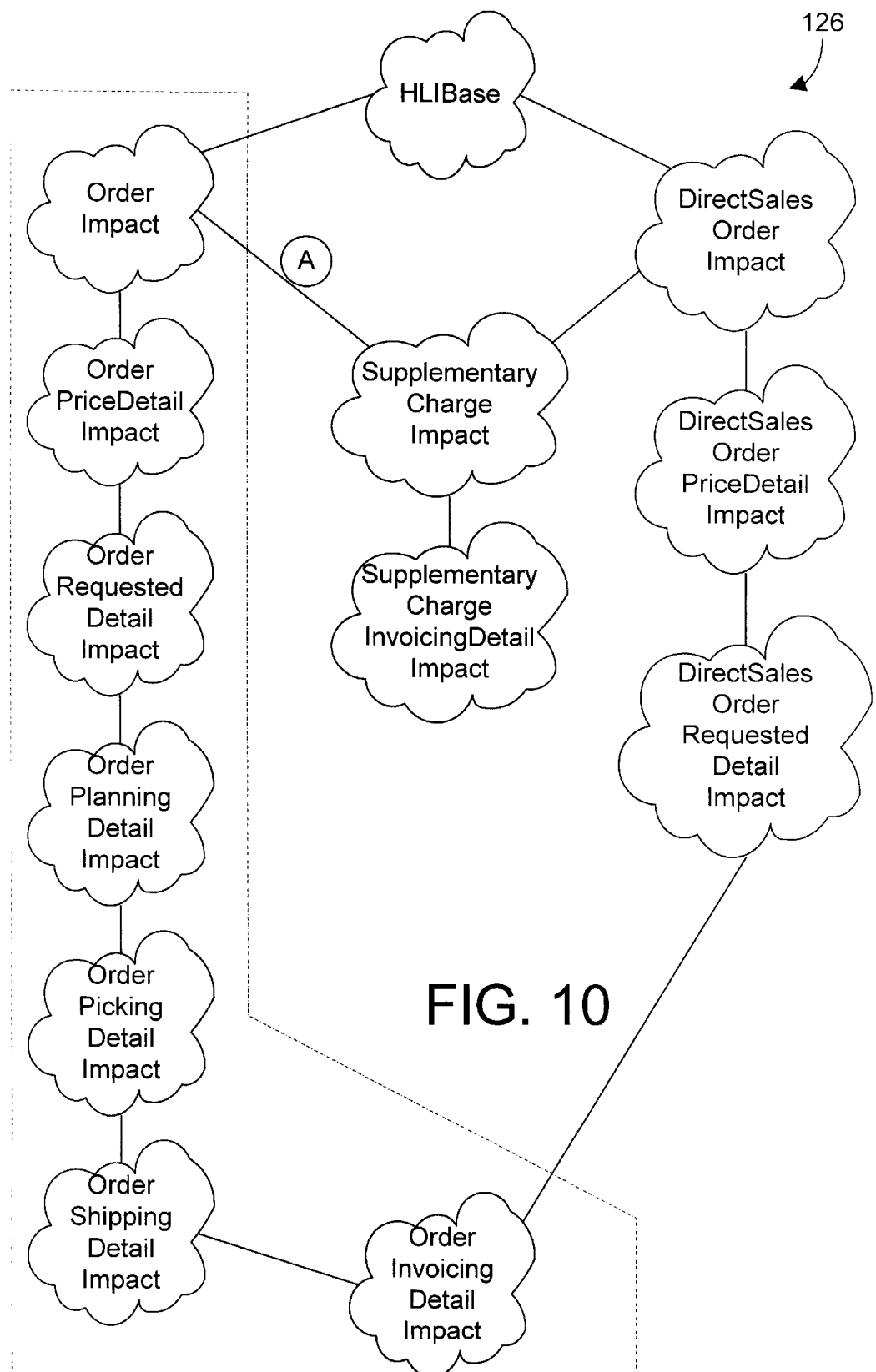
FIG. 10 is an object structure diagram showing the definition of two order types in an order processing framework.

An example of a static object structure 126 is shown in FIG. 10. HLIBase is the top-level object that contains a set of the parent-child relationships defined in the static object structure. An application can choose to arbitrarily group impact objects together in one or more HLIBase objects. For example, one application may choose to group all order impacts for purchase orders in one HLIBase object and to group all order impacts for sales orders in another HLIBase object, while a different application may choose to bundle all order impacts together in the same HLIBase object. Static object structure 126 in FIG. 10 includes the definition of two different order types. The first corresponds to a full sales order, as shown by the process flow down the left side of FIG. 10. The second corresponds to a direct sales order, as shown by the process flow down the right side of FIG. 10. Note that both of these process flows share two common portions, one represented by the SupplementaryChargeImpact object and the SupplementaryChargeInvoicingDetailImpact object, and the other represented by the OrderInvoicingDetailImpact object. Each child object of HLIBase corresponds to the first step in a defined process flow. The portion of the full sales order process flow in the dashed box represents the portion represented in more detail in FIG. 11.

The static object structure 126 of FIG. 10 is shown along the left side of FIG. 11. Note that the SupplementaryChargeImpact and SupplementaryChargeInvoicingDetailImpact objects are not shown in FIG. 11 for the sake of simplicity, although the reference from. OrderImpact to SupplementaryChargeImpact is shown by a label A. FIG. 11 shows static object structure 126, along with a corresponding dynamic object structure 128. Each order detail impact has an associated LifeCycle. In addition, each order detail in the dynamic object structure 128 contains references to its corresponding process impact and to the life cycle for that impact. Note that FIG. 11 shows all order details in the dynamic object structure 128 (from Order through all intervening steps to OrderInvoicingDetail), which means that the processing flow for this order type is complete. Each order detail is actually added to the dynamic object structure 128 one at a time in their appropriate sequence defined by the static object structure 126. Note that the OrderDetail has a child relationship labeled B to a SupplementaryCharge object (not shown) that corresponds to the structure of label A defined in the static object structure 126. In addition, while a single dynamic object structure 128 is shown in FIG. 11, in reality there may be many dynamic object structures that each have references to a single static object structure. This is analogous to many objects being instances of the same class in an object oriented system. Also, note that one order may include many order details, so a dynamic object structure 128 may include a tree structure of objects with details exploding into multiple children as needed to represent the order.

Figure 12:
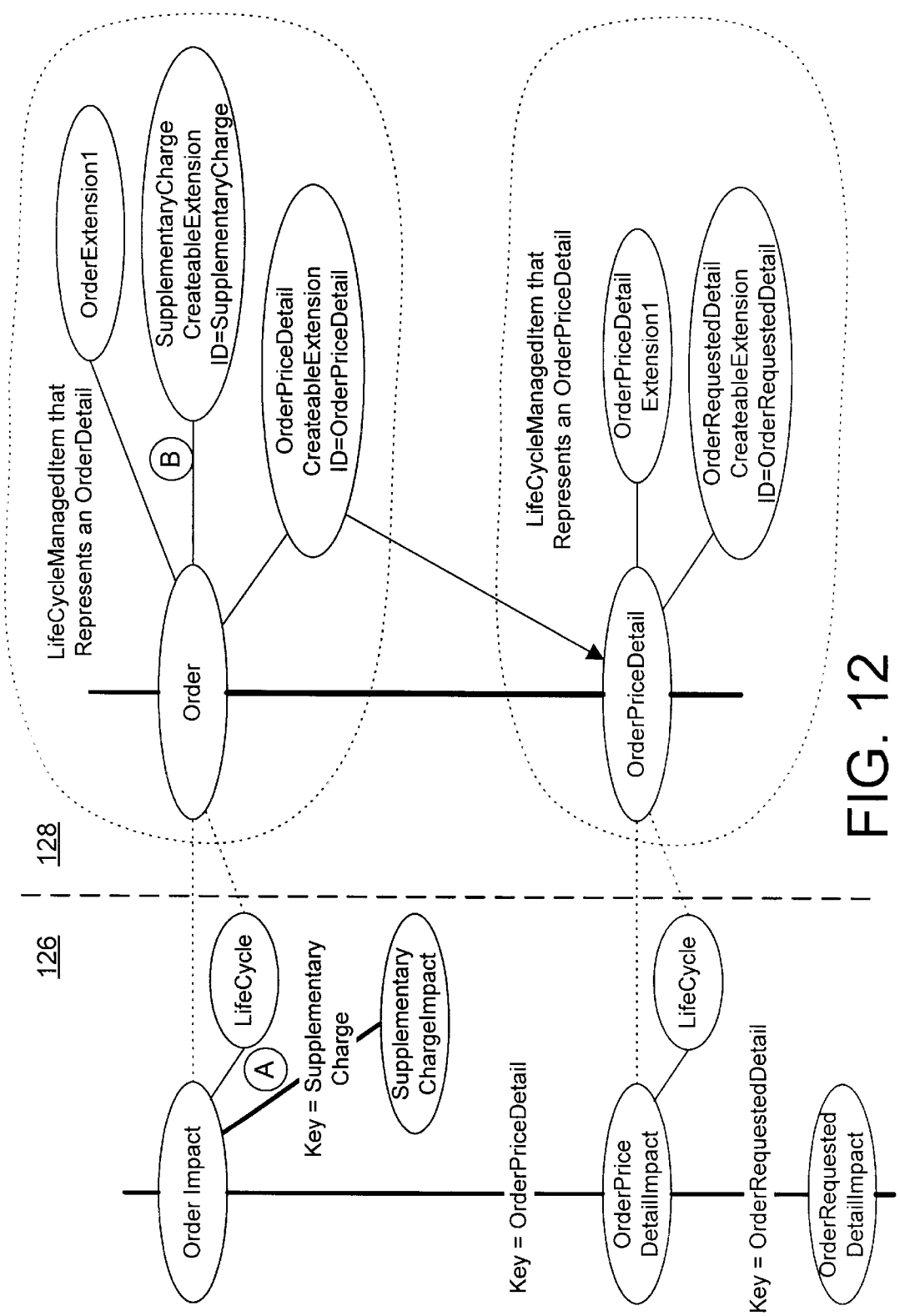
FIG. 12 is a more detailed object structure diagram for two of the process detail levels shown in FIG. 11.

For the purpose of illustrating the mechanisms of the preferred embodiments, a small portion of the order structures in FIG. 11 is reproduced in FIG. 12, with additional details. The dynamic object structure 128 of FIG. 11 makes it clear that OrderCreateableExtension creates the Order object, that OrderPriceDetailCreateableExtension creates the OrderPriceDetail object, and so on. However, not shown in FIG. 11 is the different extensions that may exist on each object in addition to its createable extension. FIG. 12 shows these relationships in greater detail.

The Order object in FIGS. 11 and 12 is actually an instance of the HierarchyLevelInformationLifeCycleManagedItem class (FIG. 7), which is a subclass of the LifeCycleManagedItem class, which is a subclass of the ExtensibleItem class discussed above with reference to FIG. 2. Thus, the Order object has extensions that the Order object uses to delegate certain method calls to dynamically change at run-time the behavior of the Order object. A generic extension for performing processing at the Order level is shown as OrderExtension1. Two other extensions are provided that correspond to the two children of the OrderImpact object on the left side of FIG. 12. OrderImpact has two children, OrderPriceDetailImpact and SupplementaryChargeImpact, and each have a corresponding key as shown. Each child of the OrderImpact object has a corresponding createable extension on the Order detail object, namely OrderPriceDetailCreateableExtension and SupplementaryChargeCreateableExtension, both of which have corresponding identifiers (ID) as shown. The combination of the Order object, its associated extensions, and any adapters (not shown) collectively comprise a LifeCycleManagedItem that represents an order detail.

In similar fashion, the LifeCycleManagedItem that represents an OrderPriceDetail includes an OrderPriceDetail object, a general extension labeled OrderPriceDetailExtension1, and a createable extension OrderRequestedDetailCreateableExtension that corresponds to the OrderRequestedDetail child of the OrderPriceDetailImpact object in the static object structure 126.

Figure 13:
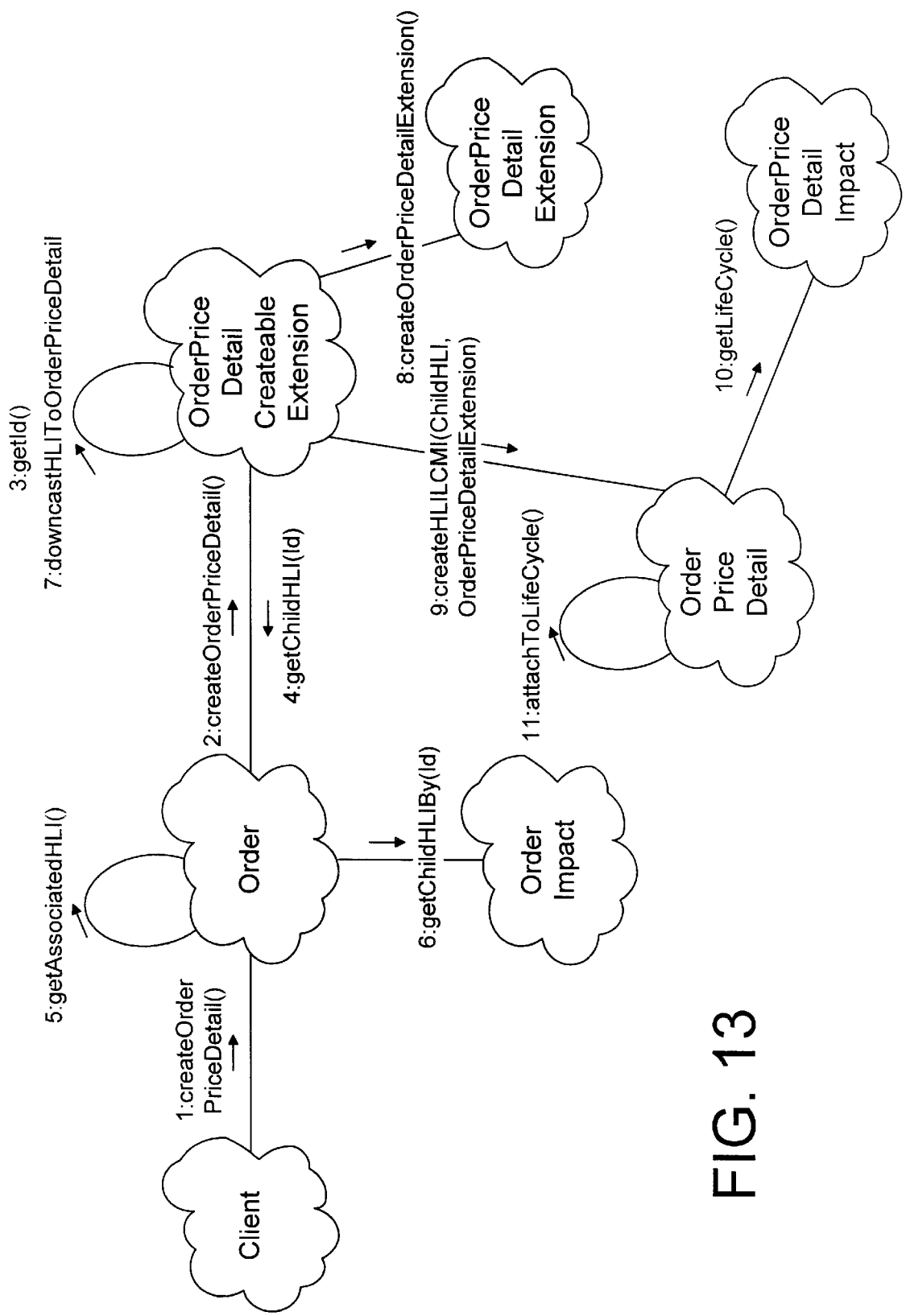
FIG. 13 is an object diagram showing the steps in creating the OrderPriceDetail of FIG. 12.

The interaction of the objects of FIG. 12 is best understood with reference to the object interaction diagram of FIG. 13. We assume that a client has completed processing at the Order level, and needs to invoke a processing method to create one or more details at the next level in the processing flow. The client invokes the createOrderPriceDetail() method on the Order object (step 1) to cause the creation of the next step in the processing flow. In response, the Order object delegates this method call to its appropriate extension by invoking the createOrderPriceDetail() method on the OrderPriceDetailCreateableExtension object. As shown in FIG. 12, the ID of a createable extension is used as a key to locate the corresponding impact. For this example, the ID corresponds to the name of the order detail that needs to be created, namely OrderPriceDetail. So the OrderPriceDetailCreateableExtension object invokes its own getId() method (step 3), which returns the ID of the OrderPriceDetailCreateableExtension object, which is OrderPriceDetail. The OrderPriceDetailCreateableExtension object then invokes the getChildHLI() method on the Order object, passing the ID as a parameter (step 4). In response, the Order object invokes its own getAssociatedHLI() method (step 5), which identifies the impact that corresponds to the Order object, namely the OrderImpact object. The Order object then invokes the getChildHLIBy() method on the OrderImpact object, passing the ID as a parameter. In response, the OrderImpact object determines from the ID the appropriate child impact specified by the ID, and returns this child impact. For the example of FIGS. 11 and 12, the ID passed as a parameter in step 6 is OrderPriceDetail, so the OrderImpact object looks for a child impact with the key OrderPriceDetail. The OrderPriceDetailImpact object has this key, so the OrderPriceDetailImpact object is returned to the Order object as a result of the method call in step 6.

Next, the OrderPriceDetailCreateableExtension downcasts the returned HLI object in step 6 (OrderPriceDetailImpact) (step 7). This downcast is necessary because the OrderPriceDetailImpact object returned in response to step 4 is typed only as an HLI. In order for an extension to access the shared data and policies contained by the returned object, that object must be downcast so that its interface reflects those shared data and policies. The OrderPriceDetailCreateableExtension object then invokes the createOrderPriceDetailExtension() constructor method (step 8), which creates the OrderPriceDetailExtension object At this point, the OrderPriceDetailExtension does not belong to an associated order detail object. So OrderPriceDetailCreateableExtension invokes a create() constructor method (step 9), passing in the OrderPriceDetailImpact and OrderPriceDetailExtension as parameters. In response, a hierarchy level information life-cycle managed item (HLILCMI) is created that has a primary extension of type OrderPriceDetail, thereby logically becoming the OrderPriceDetail object. During creation, the OrderPriceDetail object takes ownership of the OrderPriceDetailExtension object and establishes a reference to the OrderPriceDetailImpact object, thereby creating the reference in the OrderPriceDetail to the OrderPriceDetailImpact shown by the dotted line between these objects in FIGS. 11 and 12. The creation of the OrderPriceDetail object is shown in FIGS. 11 and 12 by the arrow from the OrderPriceDetailCreateableExtension to the OrderPriceDetail object. The OrderPriceDetail object then invokes the getLifeCycle() method on the OrderPriceDetailImpact object (step 10), which returns a reference to the life cycle object associated with the OrderPriceDetailImpact object. Finally, the OrderPriceDetail object invokes its own attachToLifeCycle() method (step 11) to create a reference to the life cycle object returned in step 10, shown in FIGS. 11 and 12 by the dotted line between the OrderPriceDetail object and the LifeCycle object that belongs to the OrderPriceDetailImpact object. At this point the OrderPriceDetail has a reference to its corresponding OrderPriceDetailImpact object, and can invoke methods on that object to access any of the shared data or shared algorithms associated with the OrderPriceDetailImpact, as shown in FIG. 8.

The classes, objects and methods that define the static object structure 126 and the corresponding dynamic object structure 128 and the relationships between 126 and 128 collectively comprise a means for coupling together flexibly coupled processes in an object oriented framework to define a desired processing configuration.

The object interaction diagram of FIG. 13 for an order processing framework with order details may be used to show the specific steps that correspond to the more general steps in method 600 shown in FIG. 6. Because FIG. 13 is an object interaction diagram, we assume that step 610 of FIG. 6 has been performed previously, and that condition 620 is satisfied by the client needing to create an OrderPriceDetail object, which is a child to the current detail (Order). Step 630 corresponds to steps 1 and 2 in FIG. 13. Step 640 of FIG. 6 corresponds to steps 3–7 of FIG. 13. Steps 650 and 660 of FIG. 6 correspond to steps 8 and 9 of FIG. 13. Steps 10 and 11 of FIG. 13 are housekeeping methods that create the necessary references in the OrderPriceDetail to the LifeCycle object for its corresponding OrderPriceDetailImpact, and are not represented in FIG. 6. Step 670 of FIG. 6 relates to subsequent method calls not shown in FIG. 13 from the OrderPriceDetail object to the OrderPriceDetailImpact object to determine shared data and/or shared algorithms relating to the processing of the OrderPriceDetail object. Of course, the correlation between method steps in FIG. 6 and method calls in FIG. 13 is for the purpose of illustrating the broad concepts of the preferred embodiments, and should not be construed as limiting.

The preferred embodiments disclosed herein show specific implementations that allow the creation of a dynamic object structure one step at a time by invoking information stored in a corresponding static object structure that defines a desired process flow. In this manner processes in an object oriented framework may be coupled together in any suitable manner without the objects having any knowledge about the processes that precedes or follows it. This allows the same processes to be used in many different process flows. In addition, the configuration of the present invention allows all domain-specific information to be defined by a programmer without affecting the domain-neutral mechanisms in the framework that make the coupling together of flexibly coupled processes possible.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   an object oriented framework mechanism residing in the memory, the object oriented mechanism including:
      a static object structure that defines a plurality of processing levels coupled together to define at least one processing environment, each processing level in the static object structure including hierarchy level information that specifies allowable subsequent process steps, if any.

2. The apparatus of claim 1 wherein the static object structure is defined at configuration time for the object oriented framework mechanism.

3. The apparatus of claim 1 wherein the static object structure defines shared data and at least one shared policy.

4. The apparatus of claim 1 wherein each processing level in the static object structure also includes life cycle information corresponding to the processing level.

5. The apparatus of claim 1 further comprising a dynamic object structure having a plurality of levels that are each constructed in accordance with the hierarchy level information in the static object structure.

6. The apparatus of claim 5 wherein the dynamic object structure is constructed at run-time, when an application that uses the object oriented framework mechanism is executed.

7. The apparatus of claim 5 wherein a subsequent level in the dynamic object structure is created by invoking the hierarchy level information in the level in the static object structure corresponding to the current level to determine that the subsequent level is an allowable subsequent process step defined by the static object structure.

8. The apparatus of claim 5 wherein the framework mechanism further comprises:
   a hierarchy level information class that defines at least one impact object corresponding to a processing level in the static object structure; and
   a process detail class that defines at least one process detail object corresponding to a level in the dynamic object structure.

9. The apparatus of claim 5 wherein an instance of the process detail class is created using hierarchy level information in the static object structure.

10. An apparatus comprising:
    (1) at least one processor;
    (2) a memory coupled to the at least one processor,
    (3) an object oriented order processing framework residing in the memory, the order processing framework including:
       (A) a static object structure that defines a plurality of flexibly coupled process steps coupled together to define at least one order type, each process step in the static object structure including hierarchy level information that specifies allowable subsequent process steps, if any;
       (B) a dynamic object structure having a plurality of order details that are each constructed in accordance with the hierarchy level information in the static object structure;
       (C) a hierarchy level information class that defines at least one impact object corresponding to a process step in the static object structure; and
       (D) an order detail class that defines at least one order detail object corresponding to an order detail in the dynamic object structure.

11. The apparatus of claim 10 wherein an instance of the order detail class is created using hierarchy level information in the static object structure.

12. An apparatus comprising:
    a memory;
    an object oriented framework residing in the memory, the object oriented framework including means for coupling together flexibly coupled processes in the object oriented framework to define a desired processing configuration by invoking at least one method on a static object structure that defines a plurality of processing levels coupled together to define at least one processing environment, each processing level in the static object structure including hierarchy level information that specifies allowable subsequent process steps, if any.

13. A method for defining a static object structure that includes a plurality of processing levels coupled together to define at least one processing environment, each level in the static object structure including hierarchy level information that specifies allowable subsequent process steps, if any, the method comprising the steps of:

defining a class hierarchy by coupling together a plurality of classes representing the plurality of processing levels; and specifying a valid subsequent process, if one exists, for each processing level, each valid subsequent process corresponding to one of the plurality of classes at the next processing level.

14. The method of claim 13 further comprising the step of creating instances of each of the plurality of classes at run-time.

15. The method of claim 13 further comprising the step of defining life cycle information corresponding to each processing level.

16. The method of claim 13 wherein the plurality of classes correspond to a plurality of processes that may be flexibly coupled together in the framework to define a desired processing environment.

17. A method for processing a desired process type comprising the steps of:

(A) creating a static object structure that defines a plurality of processing levels coupled together to define the desired process type, each level in the static object structure including hierarchy level information that specifies allowable subsequent process steps, if any;

(B) when a client program needs to create a next step in a process flow defined by the process type, invoking a method on a current process detail;

(C) locating a process detail impact corresponding to the current process detail, the process detail impact including hierarchy level information that specifies allowable subsequent process steps, if any, that follow the process detail impact;

(D) determining from the process detail impact corresponding to the current process detail a child process detail impact corresponding to an allowable subsequent process step; and (E) creating a child process detail that is a child of the current process detail in accordance with information in the child process detail impact.

18. The method of claim 17 further comprising the step of creating a reference in the child process detail to its corresponding child process detail impact.

19. The method of claim 17 further comprising the step of creating a reference in the child process detail to a life cycle that corresponds to the child process detail impact that corresponds to the child process detail.

20. The method of claim 17 further comprising the steps of accessing shared data and shared algorithms defined by the child process detail impact.

21. A program product comprising:

an object oriented framework mechanism including a static object structure that defines a plurality of processing levels coupled together to define at least one processing environment, each processing level in the static object structure including hierarchy level information that specifies allowable subsequent process steps, if any; and signal bearing media bearing the framework mechanism.

22. The program product of claim 21 wherein the signal bearing media comprises recordable media.

23. The program product of claim 21 wherein the signal bearing media comprises transmission media.

24. The program product of claim 21 wherein each processing level in the static object structure also includes life cycle information corresponding to the processing level.

25. The program product of claim 21 wherein the static object structure defines shared data and at least one shared policy.

26. The program product of claim 21 further comprising a dynamic object structure having a plurality of levels that are each constructed in accordance with the hierarchy level information in the static object structure.

27. The program product of claim 21 wherein the framework mechanism further comprises:

a hierarchy level information class that defines at least one hierarchical level information object corresponding to a processing level in the static object structure; and a process detail class that defines at least one process detail object corresponding to a level in the dynamic object structure.

28. A program product comprising:

(1) an object oriented order processing framework including:

(A) a static object structure that defines a plurality of flexibly coupled process steps coupled together to define at least one order type, each process step in the static object structure including hierarchy level information that specifies allowable subsequent process steps, if any;

(B) a dynamic object structure having a plurality of order details that are each constructed in accordance with the hierarchy level information in the static object structure;

(C) a hierarchy level information class that defines at least one impact object corresponding to a process step in the static object structure; and (D) an order detail class that defines at least one order detail object corresponding to an order detail in the dynamic object structure; and (2) signal bearing media bearing the framework mechanism.

29. The program product of claim 28 wherein the signal bearing media comprises recordable media.

30. The program product of claim 28 wherein the signal bearing media comprises transmission media.

* * * * *